United States Patent [19]

Jozlin

[11] 3,710,764
[45] Jan. 16, 1973

[54] IGNITION APPARATUS
[75] Inventor: Joseph A. Jozlin, Warren, Mich.
[73] Assignee: William T. Sevald, Royal Oak, Mich.
[22] Filed: Feb. 26, 1971
[21] Appl. No.: 119,185

[52] U.S. Cl........123/32 SP, 123/143 R, 123/169 V, 123/DIG. 9
[51] Int. Cl..............................................F02p 23/00
[58] Field of Search.123/32 SP, 32 SJ, 119, 139 AW, 123/143 A, 143 B, 143 R, 33 CV, 169 V

[56] References Cited

UNITED STATES PATENTS

| | | | |
|---|---|---|---|
| 1,700,603 | 1/1929 | Vreeland et al. | 123/143 B |
| 1,555,454 | 9/1925 | Bugatti | 123/143 B |
| 1,356,247 | 10/1920 | White | 123/143 B |
| 3,213,839 | 10/1965 | Gitlin et al. | 123/143 A |

OTHER PUBLICATIONS

Project Stratofire by Keith H. Rhodes 1-66 Society of Automotive Engineers, 485 Lexington Ave. New York No. 660094. pages 1-8

Primary Examiner—Laurence M. Goodridge
Attorney—William T. Sevald

[57] ABSTRACT

A jet flame ignition apparatus for internal combustion engines having a pressure chamber including the spark-plug and equipped with a one-way valve controlling a relatively large port allowing relatively free entry of fuel mixture into the chamber from the cylinder during the piston compression stroke and preventing free exit of burning fuel mixture from the chamber during the piston power stroke to trap the expansion of the burning gases in the chamber to produce pressure, and at least one relatively small jet passage leading from the chamber to the cylinder for emitting the burning fuel mixture from the chamber in a jet flame propelled by the pressure in the chamber into the cylinder to ignite the fuel mixture in the cylinder.

10 Claims, 23 Drawing Figures

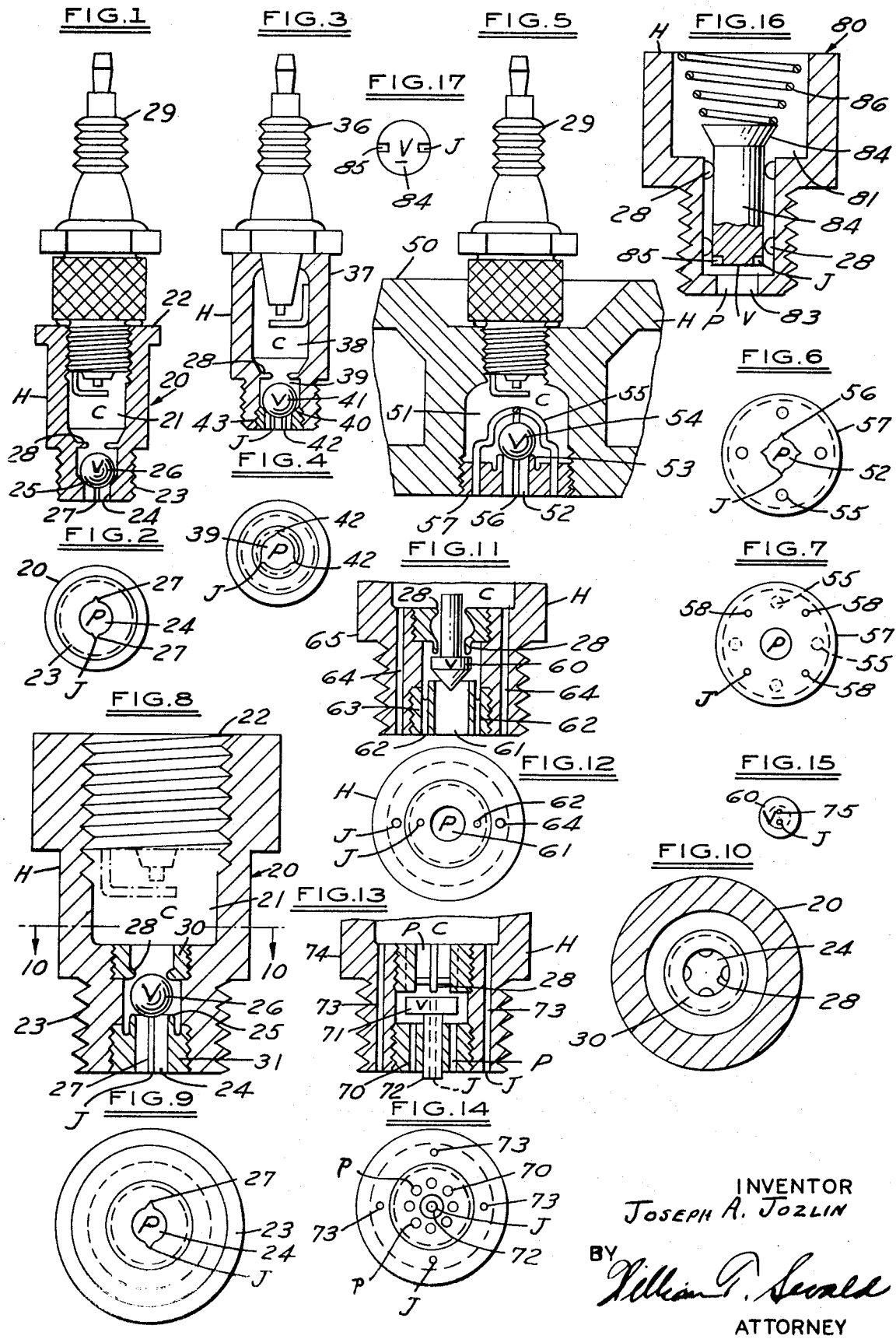

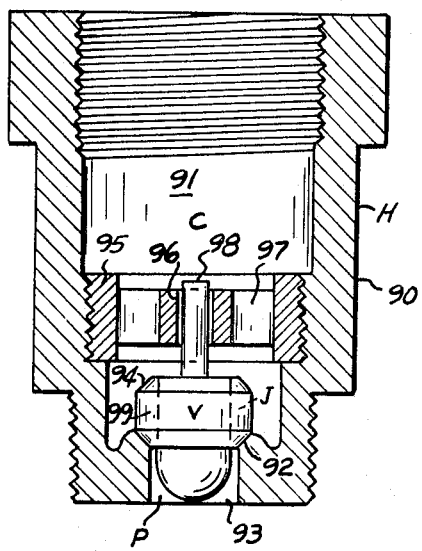
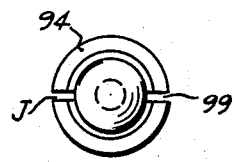
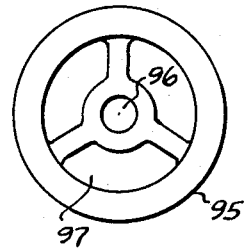
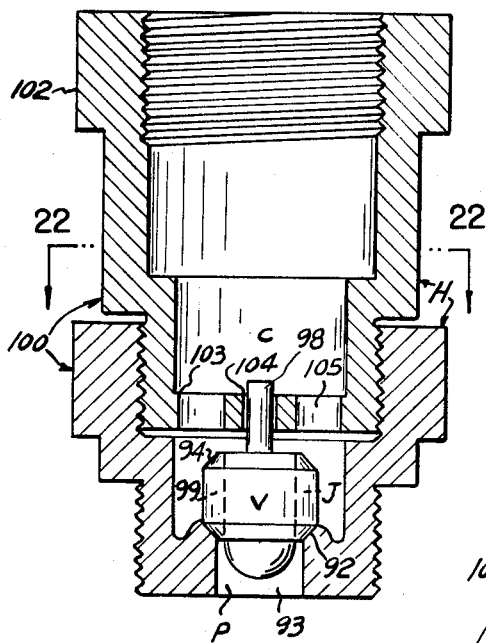
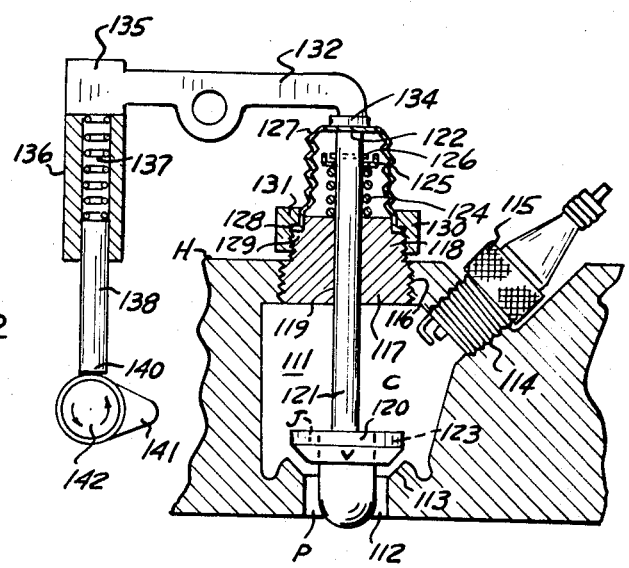
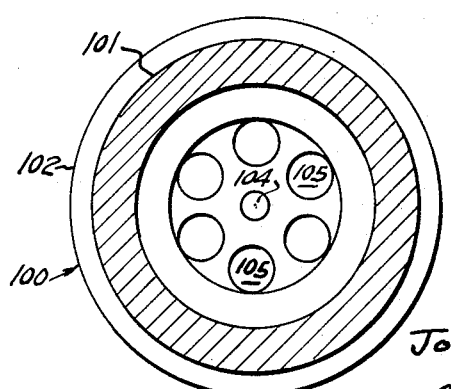

IGNITION APPARATUS

This invention relates to jet flame ignition apparatus, devices, structures, integrations, and combinations for internal combustion engines.

An object of the invention is to provide an improved jet flame ignition device for internal combustion engines which is simple in design and construction, inexpensive to manufacture, easy to use, mount, and integrate.

An object of the invention is to provide an improved jet flame ignition device which effects substantially complete combustion of the fuel mixture in the cylinder to reduce unburned and partially burned fuel residues in exhaust emissions, to produce more power with a given quantity of fuel, to give increased speed and/or increased milage with a given quantity of fuel, to facilitate the use of relatively lower grade fuels than otherwise usable in a given engine, to improve engine performance, to reduce corrosive emissions relative to the exhaust pipes and mufflers, and reduce the emissions of contamenating gases, fumes, smokes, solids, and liquids to atmosphere.

An object of the invention is to provide a jet flame ignition apparatus which has a pressure chamber enveloping the spark plug and equipped with a one-way valve controlling a relatively large port allowing relatively free entry of combustible fuel mixture into the chamber from the cylinder during the compression stroke of the piston and blocking free exit through the port of burning fuel mixture from the chamber during the power stroke of the piston to produce pressure in the chamber from the trapped burning fuel mixture ignited by the spark plug.

An object of the invention is to provide at least one relatively small jet passage, groove, or orifice leading from the chamber and not blocked by the valve during the power stroke for projecting the burning fuel mixture and/or burning gases from the chamber in a jet-flame into the fuel mixture in the cylinder to ignite substantially all the fuel mixture in the cylinder.

An object of the invention is to provide various apparatus and devices embodying the invention for interposition between a spark plug and a cylinder.

An object of the invention is to combine structure embodying the invention with a spark plug.

An object of the invention is to combine structure embodying the invention with an engine.

These and other objects of the invention will become apparent by reference to the following description of apparatus, devices, structure, integrations, and combinations embodying the invention taken in connection with the accompanying drawing, in which:

FIG. 1 is a vertical cross-sectional view of an adapter type apparatus having a pressure chamber, a relatively large inlet port, a valve seat in the port, a ball valve at the seat, and relatively small jet-flame outlet passages, and showing a spark plug in side elevation.

FIG. 2 is a bottom end view of the device seen in FIG. 1 showing the inlet port and two groove jet passages.

FIG. 3 is a cross-sectional view of a device of the invention as embodied integrally with a spark plug, showing the spark-plug portion in elevation.

FIG. 4 is a bottom end view of the device seen in FIG. 3 showing the inlet port and three groove jet passages.

FIG. 5 is a cross-sectional view of an engine shown in broken away portion illustrating the pressure chamber, inlet port, jet passages, and valve, and showing a spark-plug in elevation.

FIG. 6 is a bottom view of the construction seen in FIG. 5 showing the inlet port, four jet passages, and the ends of the valve cage members.

FIG. 7 is a view similar to FIG. 6, showing the inlet port, separate jet passages, and the ends of the valve cage members in dotted lines.

FIG. 8 is an enlarged view of the device seen in FIG. 1 showing the valve cage, seat, inlet port, and groove jet passages in more detail.

FIG. 9 is a bottom end view of the device seen in FIG. 8.

FIG. 10 is a cross-sectional view of the device seen in FIG. 8, taken on the line 10—10 thereof, showing the valve cage dogs and by-pass relief at the dogs in more detail.

FIG. 11 is a broken away showing of the lower portion of a device similar to FIG. 8, showing a conical valve and separate jet passage apertures.

FIG. 12 is a bottom view of the device seen in FIG. 11.

FIG. 13 is a similar view to FIG. 11 showing a mushroom valve, multiple inlet ports and jet flame passages in both the valve and the housing;

FIG. 14, is a bottom view of the device seen in FIG. 13.

FIG. 15 is a bottom view of the valve as seen in FIG. 11 showing a modification wherein the valve has two jet passages.

FIG. 16 is a cross-sectional view similar to FIG. 8, showing a spring-pressed valve and the jet grooves formed in the valve showing the valve off the seat;

FIG. 17 is a bottom view of the valve as seen in FIG. 16 showing the jet slots.

FIG. 18 is a cross-sectional view, similar to FIG. 8, showing a modification with an annular valve having a spherical tip and jet passages in the valve shown in dotted lines and showing a valve retainer-guide above the valve.

FIG. 19 is a bottom view of the valve seen in FIG. 18 showing the jet passage slots in elevation.

FIG. 20 is a plan view of the valve retainer-guide seen in FIG. 18, showing the inter-communication openings and the valve guide hole.

FIG. 21 is a cross-sectional view, similar to FIG. 8, showing a modified two-part housing with the valve in the lower part and the valve guide in the upper part.

FIG. 22 is a cross-sectional view of the device seen in FIG. 21, taken on the line 22—22 thereof, showing the inter-communication openings and the valve guide aperture in the upper part; and FIG. 23 is a cross-sectional view of an engine portion showing a cam-operated valve schematically and showing a spring-positioned valve and sealing gland for operation by a rocker arm.

Referring now to the drawing wherein like reference letters and numerals refer to like and corresponding parts throughout the several views, the jet flame ignition apparatus, devices, structures, combinations and incorporations disclosed therein to illustrate the invention comprise, a housing H having a cavity defining a chamber C. The housing H is adapted to include a spark plug or other ignition device in communication with the chamber C. A relatively large port P is formed in the housing H for communication with the cylinder of an engine. A one-way valve V is mounted on the housing H in the port P allowing entry of fuel mixture from the cylinder to the chamber C and preventing exit of fuel mixture and/or burning gases from the chamber C through the port P to the cylinder of the engine. At least one jet passage, channel, groove, and/or orifice J is formed in or on the housing H and or valve V. The jet passage J communicates between the chamber C and the cylinder of the engine. With an embodiment of the invention integrated with an engine and upon the compression stroke of the piston, the valve is open and the fuel mixture in the cylinder is forced through the open port P into the chamber C. Upon the power stroke of the piston, the valve V is closed, the port P is blocked and the fuel mixture in the chamber C is ignited by the spark plug and burns and expands. The burning gases cannot escape through the port P so that the expansion is trapped causing a pressure build-up in the chamber C higher than the compression pressure in the cylinder. This higher pressure in chamber C expels the burning gases in a jet flame through the jet passage or passages J into the cylinder to ignite the fuel mixture in the cylinder.

Referring now to various exemplary embodiments, the socket 20, FIGS. 1, 2, 8, 9, and 10, has a cavity 21, a female threaded end 22, a male threaded end 23, a port 24, a valve seat 25, a valve 26 in the port 24, and jet grooves 27 in the seat 25 constituting jet passages not closable by the valve 26. Dogs 28 are formed on the socket 20 to cage the valve 26 in the port 24 above the seat 25. A spark plug 29 is screwed in the female end 22 and the male end 23 is screwed in spark plug hole of the engine.

In the embodiment of FIGS. 8, 9, and 10, an insert 30 is mounted on the socket 20 in the port 24 and includes the dogs 28 and an insert 31 is mounted on the socket 20 in the port 24 and includes the valve seat 25 and the jet grooves 27.

In the embodiment of FIGS. 3 and 4, the apparatus includes a spark plug 36 portion and a case 37. The case includes a cavity 38, a port 39, a valve seat 40, a valve 41, and jet passage grooves 42. The dogs 28 are formed on the case 37 and an insert 43 forms the seat 40 and grooves 42.

In the embodiment of FIGS. 5 and 6, an engine portion 50 has a cavity 51 including a port 52, a valve seat 53, a valve 54, valve cage members 55, and jet passage grooves 56. The spark plug 29 is mounted at the cavity 51. An insert 57 may embody the port 52, seat 53, and passages 56 and support the valve cage members 55. In the embodiment of FIG. 7, jet passage orifices 58 are spaced from the port 52 and are individually formed and are independent of the port 52.

In the embodiment of FIGS. 11 and 12, a conical valve 60 controls the port 61 and independent jet passage orifices 62 are formed in the insert 63 and/or independent jet passage orifices 64 are formed in the body 65.

In the embodiment of FIGS. 13 and 14, multiple inlet ports 70 are controlled by a mushroom shaped valve 71 and a jet orifice passage 72 is formed in the valve 71 and/or jet passage orifices 73 are formed in the body 74.

In the embodiment of FIG. 15 showing the valve 60 of FIG. 11, two jet channel passages 75 are formed in the valve 60.

In the embodiment of FIGS. 16 and 17, a housing 80 has a cavity 81, a valve seat 82, a port 83, a valve 84, jet slots 85 in the valve 84, dogs 28, and a spring 86 displacably urging the valve 84 on the seat 82.

In the embodiment of FIGS. 18, 19, and 20, the housing 90 has a cavity 91, a valve seat 92, and a port 93. An annular valve 94 seals against the seat 92. A valve retainer-guide 95 is fixed in the housing 90 and has a valve guide hole 96 and intercommunicating openings 97. The valve 94 has a stem 98 lying in the hole 96 of the guide 95 and jet passage slots 99 by-passing the seat 92 and the valve 94 when the valve 94 is closed on the seat 92. The valve 94 shown in FIGS. 18 and 19 is the same type shown in FIGS. 22 and 23.

In the embodiment of FIGS. 21 and 22, the housing 100 is comprised of a lower part 101 and an upper part 102. The lower part 101 has a valve seat 92 and contains the valve 94 for closing the port 93. The upper portion 102 has a valve guide-retainer end 103 equipped with a valve guide hole 104 receiving the valve stem 98 and inter-communicating openings 105 lying between the parts 101 and 102 of the housing 100.

In the embodiment of FIG. 23 an engine portion 110 constitutes the housing and has a cavity 111, a port 112, and a valve seat 113 at the port 112. The engine portion also has a spark plug hole 114 for mounting a spark plug 115 and an assembly opening 116. An insert 117 is set in the opening 116 and has a stepped and threaded crown 118 and a valve guide hole 119. A valve 120 seals against the seat 113 at the port 112 and has a stem 121 lying in the guide hole 119 of the insert 117. The stem 121 extends above the insert 117 and terminates in an upper end 122. The valve 120 has jet passages 123 by-passing the valve 120 and the seat 113 at the port 112. A light spring 124 surrounds the valve stem 121 below its upper end 122. The spring 124 abuts the crown 118 of the insert 117 and is connected to the valve stem 121 by a washer 125 and pin 126. The spring 124 thus normally lifts the valve 120 off the seat 113. A flexible gland 127 fits over the upper end 122 of the valve stem 121 and has a flange 128 resting on the step 129 of the crown 118. A nut 130 is threaded on the crown 118 and has a collar 131 sealing the flange 128 of the gland 127 on the step 129 of the crown 118. A rocker arm 132 has a pivot pin 133, a valve end 134 bearing on the upper end 122 of the valve stem 121 through the gland 127, and a lifter end 135. A sleeve 136 abuts the lifter end 135 and contains a relatively heavy spring 137. A rod 138 has an upper end 139 in the sleeve 136 abutting the spring 137 and a lower end 140. A cam 141 on a shaft 142 rides against the lower end 140 of the rod 138.

In the operation of the apparatus of FIG. 23, during the compression stroke of the piston, the cavity 111 is charged with fuel mixture and the cam 141 is moving into engagement with the lift rod 138. The cam 141 is timed to close the valve 120 against the seat 113 prior to the firing of the spark plug 115. Upon the spark plug 115 igniting the fuel mixture in the chamber C cavity 111, the burning fuel mixture is jetted through the jet passage slots 123 and into the cylinder of the engine to ignite the fuel mixture in the cylinder.

Relative to the spring biased embodiments of FIGS. 16 and 23, it will be understood that a spring may be used to bias the valve normally closed or normally open and the rocker arm used to lift or depress. An insert as exemplified by the insert 117 may be used to mount a valve as exemplified by the valve 120 with or without a rocker arm. In this regard the expansion of the gases in the cavity 111 may be utilized to blow the valve shut without the action of a rocker arm 132 when biased normally open. When biased normally closed, the pressure in the cylinder during the compression stroke may be utilized to blow the valve open. Thus the embodiment of FIG. 23 may be constructed to bias the valve either normally closed or normally open to suit the engineering of the invention with an engine and with or without mechanical actuation.

It will be understood that the foregoing exemplary embodiments are shown with various modifications which are useable singly and in combination with each other. The showings are not by way of limitation as to any embodiment or by way of limitation on the whole disclosure of the invention.

The socket, case, body and/or engine portion may be made of relatively flame erosion resisting material such as tungsten carbide, refactories, ceramics, etc. Also that the inserts, valves, dogs, cage members etc., may be made of flame erosion resisting materials and interfitted with bodies, cases, sockets, shousings, etc., made of steel, iron and other less resistant materials. Also the entire apparatus may be made of erosion resistant material.

In other words, in the engineering of the invention, the selection of materials, the design and shape of various bodies, parts, and components, the size of chambers, ports, jet passages, valve seats and valves, and the number of ports and jet passages and their positioning and location may be modified and integrated to suit the engine, piston displacement, fuels, carburetion, etc., to best advantage and to suit the fabrication of parts and the manufacture of the embodiments of the invention.

In use and operation, the jet flame ignition apparatus for internal combustion engines may be embodied as a housing positionable between the spark plug and the engine, as a case on the spark plug, and/or as a portion of an engine head or block forming an internal chamber. The housing, case, and engine portion has a relatively large port leading between a cylinder and the chamber with a valve seat at the port, valve locating means, a one-way valve at the seat allowing entry from the cylinder through the port to the chamber and preventing exit to the cylinder through the port from the chamber, and at least one relatively small jet passage leading from the chamber to the cylinder not controlled by the valve.

The valve is adapted to open off the seat to allow entry of fuel mixture from the cylinder through the port to the chamber. The valve is adapted to close to prevent exit through the port from the chamber to the cylinder in response to higher pressure in the chamber than at the port, by a spring resiliently urging the valve closed, by gravity, by mechanism, etc. The valve is closed to effect a build-up of pressure in the chamber as follows.

With the apparatus integrated with an engine cylinder and a spark plug, upon the compression stroke of the piston in the cylinder, fuel mixture is forced from the cylinder through the port into the chamber past the valve responsive to the higher pressure in the cylinder than in the chamber; upon the power stroke of the piston on the cylinder and ignition of the fuel mixture in the chamber by the spark plug the fuel mixture burns and produces expanding gases raising the pressure in the chamber higher than in the cylinder which is blocked by the valve preventing escape through the port; and with the valve closed and blocking the port during the burning and production of expanding gases occuring in the chamber, the pressure in the chamber rises higher than the pressure in the cylinder and forces the burning fuel mixture in the chamber through the jet passage in a jet flame into the cylinder to ignite the fuel mixture in the cylinder.

It will thus be understood that the entry of the fuel mixture through the large port to the chamber is relatively unrestricted and that the entry of the burning fuel mixture through jet passage is relatively restricted and under higher forcing pressure so that the velocity of the jet flame through the jet passage and into the cylinder is high and effective to penetrate and permeate the fuel mixture in the cylinder to ignite the fuel mixture in the cylinder substantially completely.

The invention is limited only by the appended claims.

I claim:

1. A jet flame ignition apparatus for internal combustion engines comprising,
   a housing having a cavity constituting a chamber;
   means on said housing for mounting an ignition device in said chamber;
   means on said housing forming a relatively large port, leading to and from said chamber,
   a one-way valve and a valve seat on said housing at said port allowing relatively free entry through said port to said chamber and preventing free exit through said port from said chamber, and
   means on said housing forming at least one relatively small jet passage leading from said chamber;
   said apparatus being integratable with an engine with said port and said jet passage in communication with the cylinder of an engine;
   with said apparatus integrated with an engine and an ignition device,
   said port and valve supply combustible fuel mixture from the cylinder to said chamber upon the compression stroke of the piston in the cylinder;
   upon the power stroke of the piston in the cylinder and ignition of the fuel mixture in said chamber by the ignition device, said valve in said port prevents free escape through said port of the expanding gases resulting from the combustion of the fuel mixture in said chamber and confines them therein to develop increased pressure in said chamber; and
   the burning fuel mixture and gases under the increased pressure in said chamber are forced through said jet passage and project in a jet flame into the cylinder to ignite the fuel mixture in the cylinder.

2. In an apparatus as set forth in claim 1, said housing comprising a hollow socket having a threaded male end screwable into the threaded spark plug opening of an engine and an opposite threaded female end for screwing a spark plug therein.

3. In an apparatus as set forth in claim 1, said housing comprising, a hollow case integrated with a spark plug as the engine end of said spark plug; and, said case including a threaded male end screwable into the threaded spark plug opening of an engine.

4. In an apparatus as set forth in claim 1, a portion of an engine comprising said housing.

5. In an apparatus as set forth in claim 1, means displacibly biasing said valve to a position closing said port.

6. In an apparatus as set forth in claim 1, said valve being urged to a position closing said port by the increased pressure in said chamber resulting from the burning of the fuel mixture in said chamber.

7. In an apparatus as set forth in claim 1, a plurality of jet passages and a plurality of ports wherein the combined cross-sectional area of said jet passages is substantially less than the combined cross-sectional area of said ports to provide free entry to said chamber and to restrict exit from said chamber.

8. A jet flame ignition apparatus for internal combustion engines, comprising, a hollow housing defining an internal chamber and having a threaded male end for insertion in the spark-plug hole of an engine and a threaded female end for insertion of a spark plug therein;

said housing having a relatively large port in said male end leading to said chamber, a valve seat at said port, valve locating means, a one-way valve at said seat allowing entry through said port to said chamber and preventing exit through said port from said chamber, and at least one relatively small jet passage leading from said chamber past said male end not controlled by said valve;

said seat and valve being adapted to open in response to higher pressure at said port than in said chamber to allow entry of fuel mixture through said port to said chamber and to close to prevent exit through said port from said chamber to build pressure in said chamber;

said apparatus when integrated with an engine cylinder and a spark plug, upon the compression stroke of the piston in the cylinder, receiving fuel mixture through said port into said chamber past said valve responsive to the higher pressure in the cylinder;

upon the power stroke of the piston in the cylinder and ignition of the fuel mixture in said chamber by the spark plug, the fuel mixture burns and produces expanding gases raising the pressure in said chamber higher than in the cylinder with said valve preventing escape through said port; and with said valve blocking said port and the burning and production of expanding gases occuring in said chamber the pressure in said chamber rises higher than the pressure in the cylinder and forces the burning fuel mixture in said chamber through said jet passage in a jet flame into the cylinder to ignite the fuel mixture in the cylinder.

9. A jet flame ignition apparatus for internal combustion engines comprising a spark plug, a hollow case depending from said spark plug defining an internal chamber and having a threaded male end for insertion in the spark plug hole of an engine, said case having a relatively large port in said male end leading to said chamber, a valve seat at said port, valve locating means, a one-way valve at said seat allowing entry through said port to said chamber and preventing exit through said port from said chamber, and at least one relatively small jet passage leading from said chamber past said male end not controlled by said valve, said seat and valve being adapted to open in response to higher pressure at said port than in said chamber to allow entry of fuel mixture through said port to said chamber and to close to prevent exit through said port from said chamber to build pressure in said chamber, said apparatus when integrated with an engine cylinder and a spark plug upon the compression stroke of the piston in the cylinder, receiving fuel mixture through said port into said chamber past said valve responsive to the higher pressure in the cylinder, upon the power stroke of the piston in the cylinder and ignition of the fuel mixture in said chamber by the spark plug the fuel mixture burns and produces expanding gases raising the pressure in said chamber higher than in the cylinder with said valve preventing escape through said port; and with said valve blocking said port and the burning and production of expanding gases occuring in said chamber the pressure in said chamber rises higher than pressure in the cylinder and forces the burning fuel mixture in said chamber through said jet passage in a jet flame into the cylinder to ignite the fuel mixture in the cylinder, 10. A jet flame ignition apparatus for internal combustion engines comprising, an engine portion defining an internal chamber adjacent a cylinder, said engine portion having a spark plug hole leading to said chamber and a relatively large port leading from said chamber to the cylinder;

said engine portion having a valve seat at said port, valve locating means, a one-way valve at said seat allowing entry through said port to said chamber and preventing exit through said port from said chamber, and at least one relatively small jet passage leading from said chamber to a cylinder not controlled by said valve, said seat and valve being adapted to open in response to higher pressure at said port than in said chamber to allow entry of fuel mixture through said port to said chamber and to close to prevent exit through said port from said chamber to build pressure in said chamber, said apparatus when integrated with an engine cylinder and a spark plug, upon the compression stroke of the piston in the cylinder, receiving fuel mixture through said port into said chamber past said valve responsive to the higher pressure in the cylinder;

upon the power stroke of the piston in the cylinder and ignition of the fuel mixture in said chamber by the spark plug the fuel mixture burns and produces expanding gases raising the pressure in said chamber higher than in the cylinder with said valve preventing escape through said port; and upon said valve blocking said port and the burning and production of expanding gases occuring in said chamber the pressure in said chamber rises higher than the pressure in the cylinder and forces the burning fuel mixture in said chamber through said jet passage in a jet flame into the cylinder to ignite the fuel mixture in the cylinder.

* * * * *